United States Patent
Gordon et al.

(10) Patent No.: US 8,514,944 B2
(45) Date of Patent: Aug. 20, 2013

(54) REDUCING MOTION COMPENSATION MEMORY BANDWIDTH THROUGH MEMORY UTILIZATION

(75) Inventors: Stephen Gordon, North Andover, MA (US); Darren Neuman, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 1784 days.

(21) Appl. No.: 11/101,996

(22) Filed: Apr. 8, 2005

(65) Prior Publication Data

US 2005/0281341 A1 Dec. 22, 2005

Related U.S. Application Data

(60) Provisional application No. 60/581,124, filed on Jun. 18, 2004.

(51) Int. Cl.
*H04N 7/12* (2006.01)
(52) U.S. Cl.
USPC ...................................... 375/240.25
(58) Field of Classification Search
USPC ...................................... 375/240.25
See application file for complete search history.

(56) References Cited

U.S. PATENT DOCUMENTS

| | | | | |
|---|---|---|---|---|
| 5,793,384 | A * | 8/1998 | Okitsu | 345/535 |
| 5,903,310 | A * | 5/1999 | Finotello et al. | 375/240.25 |
| 6,182,203 | B1 * | 1/2001 | Simar et al. | 712/22 |
| 6,195,389 | B1 * | 2/2001 | Rodriguez et al. | 375/240.16 |
| 6,542,541 | B1 * | 4/2003 | Luna et al. | 375/240.01 |
| 2003/0117585 | A1 * | 6/2003 | Lee | 352/244 |
| 2004/0264565 | A1 * | 12/2004 | MacInnis | 375/240.01 |
| 2005/0018909 | A1 * | 1/2005 | Lu et al. | 382/232 |

* cited by examiner

*Primary Examiner* — Richard Torrente
(74) *Attorney, Agent, or Firm* — Thomas | Horstemeyer, LLP

(57) ABSTRACT

A system and method for processing video information. Various aspects of the present invention may provide a decoder module that decodes block encoded video information. The system may, for example, include a first memory module, communicatively coupled to the decoder module, that stores video processing information utilized by the decoder module for decoding a current video block from a current video frame. The system may also, for example, include a second memory module, communicatively coupled to the decoder module, that stores reference video information from a previous video frame utilized by the decoder module for decoding the current video block. In a non-limiting exemplary scenario, the first memory module and the second memory module may be communicatively coupled to the decoder module with independent respective data and/or address buses.

28 Claims, 3 Drawing Sheets

REDUCING MOTION COMPENSATION MEMORY BANDWIDTH THROUGH MEMORY UTILIZATION

CROSS-REFERENCE TO RELATED APPLICATIONS/INCORPORATION BY REFERENCE

This patent application is related to and claims priority from provisional patent application Ser. No. 60/581,124, filed Jun. 18, 2004, and titled "REDUCING MOTION COMPENSATION MEMORY BANDWIDTH THROUGH MEMORY UTILIZATION," the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Video communication systems may utilize any of a variety of video encoding techniques to efficiently utilize limited communication bandwidth. Such systems generally utilize relatively low amounts of communication bandwidth at the expense of relatively high amounts of data processing on the transmitting and receiving systems.

Many modern video communication systems utilize video compression (or encoding) based on motion compensation. Decoding video information that has been encoded with a motion compensation technique (e.g., particularly in real-time) may require a relative large amount of memory access bandwidth. For example and without limitation, accessing reference video information for motion compensation processing may require a relatively large amount of memory access bandwidth.

The general trend has been to provide relatively larger amounts of memory access bandwidth through the utilization of larger memory modules (e.g., providing more data per read) and memory types with multiple memory accesses per read cycle (e.g., dual data rate and quadruple data rate memory chips). For various types of memory accesses, however, increasing memory access bandwidth using the above solutions may increase video decoder performance by only a low amount relative to the cost.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for processing video information, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Generally, in motion compensation, an encoder may specify the current video block size, a spatial displacement and a temporal displacement. Using this information, the decoder may form a prediction for the current video block. The spatial displacement may be referred to as the "motion vector," and the temporal displacement may be referred to as the "reference frame." Typically, the reference frame is stored in memory (e.g., DRAM) and the decoder fetches the 2D region corresponding to the reference frame from memory. However, because the motion vector might specify a sub-pixel displacement in the x and/or y direction, the decoder might extend the 2D region to the left, right, top and bottom to include pixels covered by the extent of one or more sub-pixel interpolation filter(s). Such extension of the 2D region generally results in a desire for increased memory access bandwidth.

Various methods may be utilized to increase memory access bandwidth. For example, wider memory with more data access lines may be utilized. Also, faster access memory may be utilized. Additionally, double data rate (DDR) memory or quadruple data rate (DDR-II) memory may be utilized. A memory may, for example and without limitation, comprise DRAM memory.

Various memory solutions may provide for larger amounts of data to be accessed more efficiently, thereby providing for a higher raw memory access bandwidth. However, in various scenarios, accessing relatively large amounts of data when only smaller portions are necessary may inefficiently utilize finite (and often relatively expensive) memory access bandwidth. For example and without limitation, accessing 64 bits of contiguous memory in a memory device may inefficiently utilize memory access bandwidth when only 8 bits of contiguous memory are desired.

Figure 1:
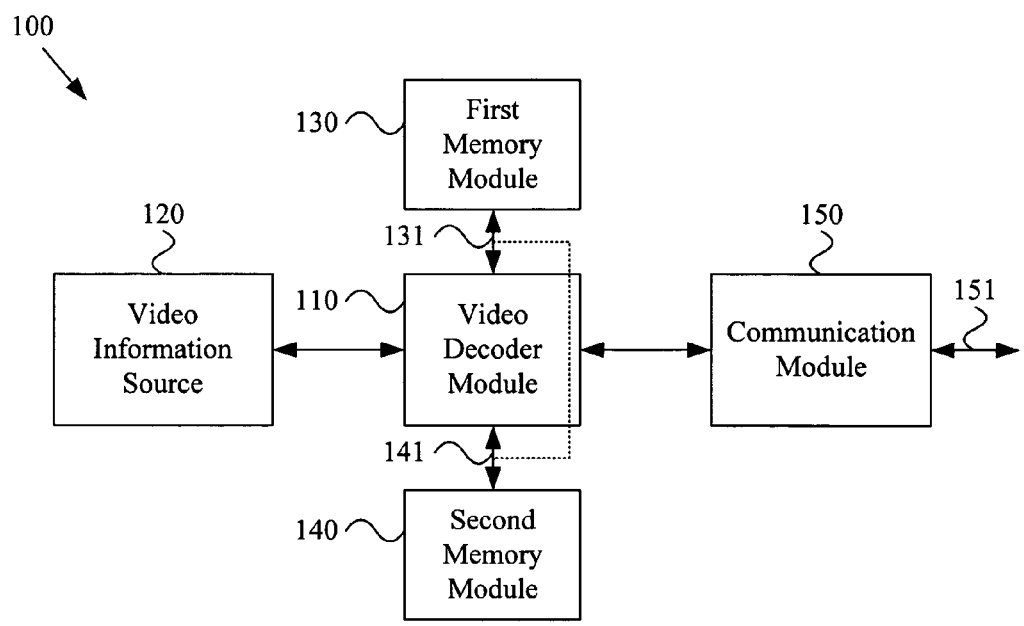
FIG. 1 is a block diagram of an exemplary video processing system, in accordance with various aspects of the present invention.

FIG. 1 is a block diagram of an exemplary video processing system 100, in accordance with various aspects of the present invention. The exemplary system 100 may comprise a video decoder module 110. The exemplary system 100 may also comprise a video information source 120 that is communicatively coupled to the video decoder module 110 and provides encoded video information to the video decoder module 110. The exemplary system 100 may also comprise a first memory module 130 and a second memory module 140 that are each communicatively coupled to the video decoder module 110. The video decoder module 110 may, for example, utilize the first memory module 130 and the second memory module 140 to decode encoded information received from the video information source 120. The exemplary system 100 may also comprise a communication module 150 that is communicatively coupled to the video decoder module 110. The communication module 150 may, for example, receive decoded video information from the video decoder module 110 and communicate one or more signals representative of the decoded video information to any of a variety of downstream entities. Various components of the exemplary video processing system 100 will now be discussed in more detail.

The exemplary video decoder module 110 may, for example, comprise characteristics of any of a large number of video decoder module types. For example and without limitation, the video decoder module may comprise characteristics of an H.264 (a.k.a., MPEG-4, part 10; and AVC) decoder module. Also for example, the video decoder module may comprise characteristics of an MPEG-2 decoder module. The video decoder module 110 may, for example, generally decode video information that has been encoded with a so-called block encoding technique (i.e., "block-encoded video information"). A block encoding technique may generally, for example, describe a block of video information relative to one or more other blocks of video information (e.g., temporally or spatially adjacent blocks). The various MPEG encoding strategies provide illustrative examples of video block encoding, but by no means is video block encoding limited to the various MPEG encoding strategies.

As mentioned previously, the exemplary video decoder module 110 may, for example, comprise characteristics of any of a large number of video decoder module types. Accordingly, the scope of various aspects of the present invention should not be limited by characteristics of any particular type of video decoder module.

The video decoder module 110 may, for example, receive an encoded video signal from the video information source 120. The encoded video signal may be encoded in a manner commensurate with any of a large variety of known, or yet to be developed, video encoding techniques. For example, in a non-limiting exemplary scenario where the video decoder module 110 is capable of decoding video information that has been encoded with a block encoding technique (e.g., MPEG-2; MPEG-4; or MPEG-4, part 10), the encoded video signal may be encoded in a manner commensurate with such a block encoding technique.

The video information source 120 may comprise characteristics of any of a number of video information sources. For example and without limitation, the video information source 120 may comprise a communication network transmitter. Such a network video information source 120 may, for example, communicate encoded video information over any of a number of media and utilizing any of a number of communication protocols.

For example and without limitation, the video information source 120 may communicate information over a cable or satellite television communication network using an MPEG protocol (e.g., MPEG-2; or MPEG-4, part 10). Also for example, the video information source 120 may communicate information over a computer communication network (e.g., the Internet, a local area network, wide area network, metropolitan area network, personal area network, etc.). Additionally for example, the video information source 120 may communicate video information over a telecommunication network (e.g., a hard-wired network, satellite telephone network, or a wireless cellular network). Accordingly, the scope of various aspects of the present invention should not be limited by characteristics of any particular type of communication network over which encoded video information may be communicated.

Also for example, the video information source 120 may comprise a receiver of encoded video information that is communicated through a communication network. For example, in a non-limiting exemplary scenario, the video information source 120 may comprise one or more components of a cable television receiver, satellite television receiver, computer modem, wireless telephone receiver, etc. Such a video information source 120 may, for example, receive one or more signals communicating encoded video information, determine the encoded video information from the one or more signals, and provide the encoded video information to the video decoder module 110.

Additionally for example, the video information source 120 may comprise a device capable of reading information from an information storage medium. For example and without limitation, the video information source 120 may comprise characteristics of a digital versatile disc ("DVD") drive or compact disc ("CD") drive. Also for example, the video information source 120 may comprise characteristics of a hard drive, mini-hard drive or zip drive interface. Further for example, the video information source 120 may comprise characteristics of any of a variety of solid-state memory drives (e.g., interfacing with memory cards, sticks, modules, flash drives, thumb drives, etc.).

Note that, depending on the specific type of video information source 120, the video information source 120 may be spatially related to the video decoder module 110 in any of a variety of manners. For example and without limitation, the video information source 120 may reside on the same integrated circuit as the video decoder module 110. Also for example, the video information source 120 may reside on the same circuit board or in the same chassis as the video decoder module 110. Further for example, the video information source 120 may reside in a different chassis, different building or different campus from the video decoder module 110. Still further for example, the video information source 120 and the video decoder module 110 may reside virtually anywhere in relation to each other.

In general, the video information source 120 may comprise characteristics of any of a large variety of video information sources. Accordingly, the scope of various aspects of the present invention should not be limited by characteristics of a particular type of video information source.

The exemplary first memory module 130 may be communicatively coupled to the video decoder module 110. For example, a first communication bus 131 (or link) may communicatively couple the first memory module 130 and the video decoder module 110. The first communication bus 131 may, for example, comprise a first address bus and a first data bus. In general, the first communication bus 131 may comprise characteristics of any of a large variety of communication bus architectures.

The first memory module 130 may, for example, be generally characterized by n-bit wide access. For example and without limitation, the first memory module 130 may be characterized by 32-bit wide access, 64-bit wide access or 128-bit wide access.

The first memory module 130 may comprise characteristics of any of a large variety of memory types. For example and without limitation, the first memory module 130 may comprise characteristics of dynamic random access memory ("DRAM"). Also for example, the first memory module 130 may comprise characteristics of double data rate ("DDR") DRAM or quadruple data rate ("DDR-II") DRAM. Accordingly, the scope of various aspects of the present invention should not be limited by characteristics of a particular memory type or structure.

The first memory module 130 may, for example, reside on a separate integrated circuit from the video decoder module 110. Alternatively, for example, the first memory module 130 may be integrated with the video decoder module 110 on a single integrated circuit. The scope of various aspects of the present invention should not be limited by characteristics of a particular degree of circuit or module integration.

The first memory module 130 may, for example, store video processing information utilized by the video decoder module 110 to decode encoded video information received from the video information source 120. Such video processing information may, for example and without limitation, comprise raw encoded video stream information (e.g., as received from the video information source 120). Such video processing information may also, for example, comprise video information (or data) that is in the process of being decoded or reconstructed into pixel information. Such video processing information may, for example, comprise video information that has been converted into display driving information. The first memory module 130 may also, for example, comprise CPU instructions, CPU data, general data cache information, etc. The scope of various aspects of the present invention should not be limited by characteristics of particular information that may be stored in the first memory module 130.

The exemplary second memory module 140 may be communicatively coupled to the video decoder module 110. The second memory module 140 may, for example and without limitation, share various characteristics with the first memory module 130 discussed previously.

The second memory module 140 may, for example, be communicatively coupled to the video decoder module 110 by a second communication bus 141 (or link). The second communication bus 141 may, for example, comprise a second address bus and a first data bus. In general, the second communication bus 141 may comprise characteristics of any of a large variety of communication bus architectures.

The second communication bus 141 may, for example and without limitation, share various characteristics with the first communication bus 131 discussed previously. For example, the second communication bus 141 may share various components with the first communication bus 131. This potential for sharing various components is generally illustrated graphically by the dashed line in FIG. 1 between the first communication bus 131 and the second communication bus 141. In a first non-limiting exemplary scenario, the second communication bus 141 may share at least a portion of address and data lines with the first communication bus 131. In a second non-limiting exemplary scenario, the second communication bus 141 may share at least a portion of address lines with the first communication bus 131 but not share any data lines. In a third non-limiting exemplary scenario, the second communication bus 141 may share at least a portion of data lines with the first communication bus 131 but not share any address lines.

The second communication bus 141 and the first communication bus 131 may also, for example, be independent. That is, the video decoder module 110 may communicate with the first memory module 130 and the second memory module 140 independently, and for example, concurrently. In a first non-limiting exemplary scenario, the second communication bus 141 may exclusively couple the second memory module 140 to the video decoder module 110. In other words, the video decoder module 110 may be the only module capable of communicating information with (e.g, reading information from or writing information to) the second memory module 140. For example, the video decoder module 110 and the second memory module 140 may comprise respective dedicated interfaces to perform such exclusive communication. Such respective interfaces may, for example, be customized to efficiently communicate one or more particular types of information (e.g., motion compensation information, including reference video information).

In general, the second communication bus 141 may communicatively couple the second memory module 140 and the video decoder module 110. The second communication bus 141 may comprise characteristics of any of a large variety of communication bus architectures. Accordingly, the scope of various aspects of the present invention should not be limited by characteristics of any particular type of communication bus architecture.

The second memory module 140 may, for example, be generally characterized by m-bit wide access. For example and without limitation, the second memory module 140 may be characterized by 16-bit wide access, 32-bit wide access or 64-bit wide access. In a non-limiting exemplary scenario, the second memory module 140 may be characterized by an m-bit wide access, and the first memory module 130 may be characterized by an n-bit wide access, where m is less than n. In such an exemplary configuration, the second memory module 140 may be utilized for storing various types of information that are relatively more efficiently accessed with narrower memory accesses, and the first memory module 130 may be utilized for storing various types of information that are relatively more efficiently accessed with wider memory accesses. In a non-limiting example, the second memory module 140 may be characterized by 16-bit wide access, and the first memory module 130 may be characterized by 32-bit or 64-bit wide access.

The second memory module 140 may comprise characteristics of any of a large variety of memory types. For example and without limitation, the second memory module 140 may comprise characteristics of DRAM, DDR DRAM, DDR-II DRAM, etc. Accordingly, the scope of various aspects of the present invention should not be limited by characteristics of a particular memory type or structure.

The second memory module 140 may, for example, reside on a separate integrated circuit from the video decoder module 110. Alternatively, for example, the second memory module 140 may be integrated with the video decoder module 110 on a single integrated circuit. Further, for example, the second memory module 140 and video decoder module 110 may reside on a first integrated circuit, while the first memory module 130 resides on a second integrated circuit. Also, for example, the first memory module 130, second memory module 140 and decoder module 110 may all reside on a single integrated circuit or separate respective integrated circuits. The scope of various aspects of the present invention should not be limited by characteristics of a particular degree of circuit or module integration.

The second memory module 140 may, for example, store motion compensation information (e.g., reference video information) that may be utilized by the video decoder module 110 (e.g., a motion compensation sub-module of the video decoder module 110) to decode encoded video information received from the video information source 120. Such reference video information may, for example and without limitation, comprise video information corresponding to a previous video frame (e.g., information from a previous video frame that was utilized to encode the current encoded video information).

In various exemplary scenarios, the second memory module 140 may store information in addition to motion compensation information. As explained in a previous example, the second memory module 140 may be exclusively linked to the video decoder module 110. In such an exemplary configuration, the video decoder module 110 may utilize the second memory module 140 to store any of a variety of private information (i.e., information utilized only by the video decoder module 110).

In a non-limiting exemplary scenario, the second memory module 140 may generally store reference video information (e.g., decoded video information generally related to a previous video frame), and the first memory module 130 may generally store non-reference video information (e.g., information generally related to the current video frame). The video decoder module 110 may, for example, access reference video information stored in the second memory module 140 and non-reference video information stored in the first memory module 130, and utilize such accessed information to decode encoded video information received from the video information source 120.

In another non-limiting exemplary scenario, the second memory module 140 may generally store decoded reference video information (e.g., from a previous decoded video frame) and also information related to previously decoded blocks of the current video frame, and the first memory module 130 may generally store video information that is encoded or partially decoded. The video decoder module 110 may, for example, generally access the decoded reference video information and other decoded video information stored in the second memory module 140 and generally access encoded or partially decoded video information stored in the first memory module 140, and utilize such accessed information to decode encoded video information received from the video information source 120.

When the video decoder module 110 decodes previously encoded video information, the video decoder module 110 may store at least a portion of the newly decoded video information in the second memory module 140 (e.g., as reference information). In a first non-limiting exemplary scenario, upon decoding a current video frame, the video decoder module 110 may store information of the decoded current video frame in the second memory module 140 to utilize as reference information for decoding the next encoded video frame. In a second non-limiting exemplary scenario, upon decoding a current video block of a video frame, the video decoder module 110 may store information of the decoded current video block in the second memory module 140. Note that the second memory module 140 may store information of more than one reference video frame. In a third non-limiting exemplary scenario, upon decoding a video block of a current video frame and upon determining that a corresponding block (or region) in a previous reference video frame will no longer be utilized, the video decoder module 110 may store information of the decoded video block in the second memory module 140. In general, the video decoder module 110 may update or maintain the second memory module 140 in any of a variety of manners. Accordingly, the scope of various aspects of the present invention should not be limited by any particular manner of, or mechanism for, maintaining information in a memory module.

The communication module 150 may be communicatively coupled to the video decoder module 110. The communication module 150 may, for example, receive decoded video information from the decoder module 110 and communicate such decoded video information to any of a variety of receivers of such information through one or more communication links 151.

The communication module 150 may comprise characteristics of any of a variety of communication modules. The communication module 150 may, for example, comprise one or more transmitters that communicate information over any of a variety of communication media (e.g., wired, wireless, tethered optical, or non-tethered optical). The communication module 150 may also, for example, communicate the decoded video information utilizing any of a large variety of communication protocols that may be utilized to communicate information (e.g., computer communication protocols, television communication protocols, telecommunication protocols, etc.). Additionally, the communication module 150 may communicate video signals that directly drive video display devices or televisions. Accordingly, the scope of various aspects of the present invention should not be limited by characteristics of any particular communication module that may communicate video information.

In a non-limiting exemplary scenario, the communication module 150 may receive decoded video data from the video decoder module 110 and communicate such decoded video data to a video receiver. In another non-limiting exemplary scenario, the communication module 150 may utilize a video display driver module to communicate such video information to a video display device in the form of display driver signals. In yet another non-limiting exemplary scenario, the communication module 150 may utilize a television driver module to communicate such decoded video information to a television (e.g., standard definition or high definition television) in the form of television input signals. For example, the communication module 150 may output component and/or composite video signals.

The communication module 150 may, for example, receive decoded video information from the decoder module 110 and communicate the decoded video information to a local video receiver or a distant video receiver. In a non-limiting exemplary scenario, the communication module 150 may reside within a chassis of a video display device or television and communicate the decoded video information to local circuitry that generates visible video information. In another non-limiting exemplary scenario, the communication module 150 may reside in a cable or satellite receiver box or a computer chassis, which is communicatively coupled to a display device. The communication module 150 may then, for example, communicate the decoded video information (i.e., one or more signals representative thereof) to the communicatively coupled display device. In yet another non-limiting exemplary scenario, the communication module 150 may reside on a video server of an office, building or campus, which is communicatively coupled by a data communication network to various devices with video display capability. The communication module 150 may, for example, communicate the decoded video information to the various devices over the data communication network in a manner commensurate with video data communication over the data communication network.

In general, the communication module 150 may receive decoded video information from the decoder module 110 and communicate such decoded video information to any of a variety of receivers. Accordingly, the scope of various aspects of the present invention should not be limited by characteristics of any particular manner of, or mechanism for, communicating decoded video information to a receiver of such information.

The previous discussion presented the exemplary video processing system 100 with exemplary first and second memory modules 130, 140. The previous discussion presented two memory modules for the sake of illustrative clarity. It should be recognized that the previous illustrative example is readily extensible to three or n memory modules, and accordingly, the scope of various aspects of the present invention should not be limited to characteristics of the previously discussed two memory module scenario.

The various modules discussed previously may be implemented utilizing hardware, software and/or a combination thereof. Additionally, various modules may share various hardware and/or software components. For example and without limitation, a first module and a second module may share various hardware components or software sub-routines. Accordingly, the scope of various aspects of the present invention should not be limited by characteristics of any particular module implementations or by arbitrary notions of module boundaries.

The exemplary video processing system 100 was presented above to provide specific illustrations of various broader aspects of the present invention. Accordingly, the scope of various aspects of the present invention should not be limited by characteristics of the exemplary video processing system 100.

Figure 2:
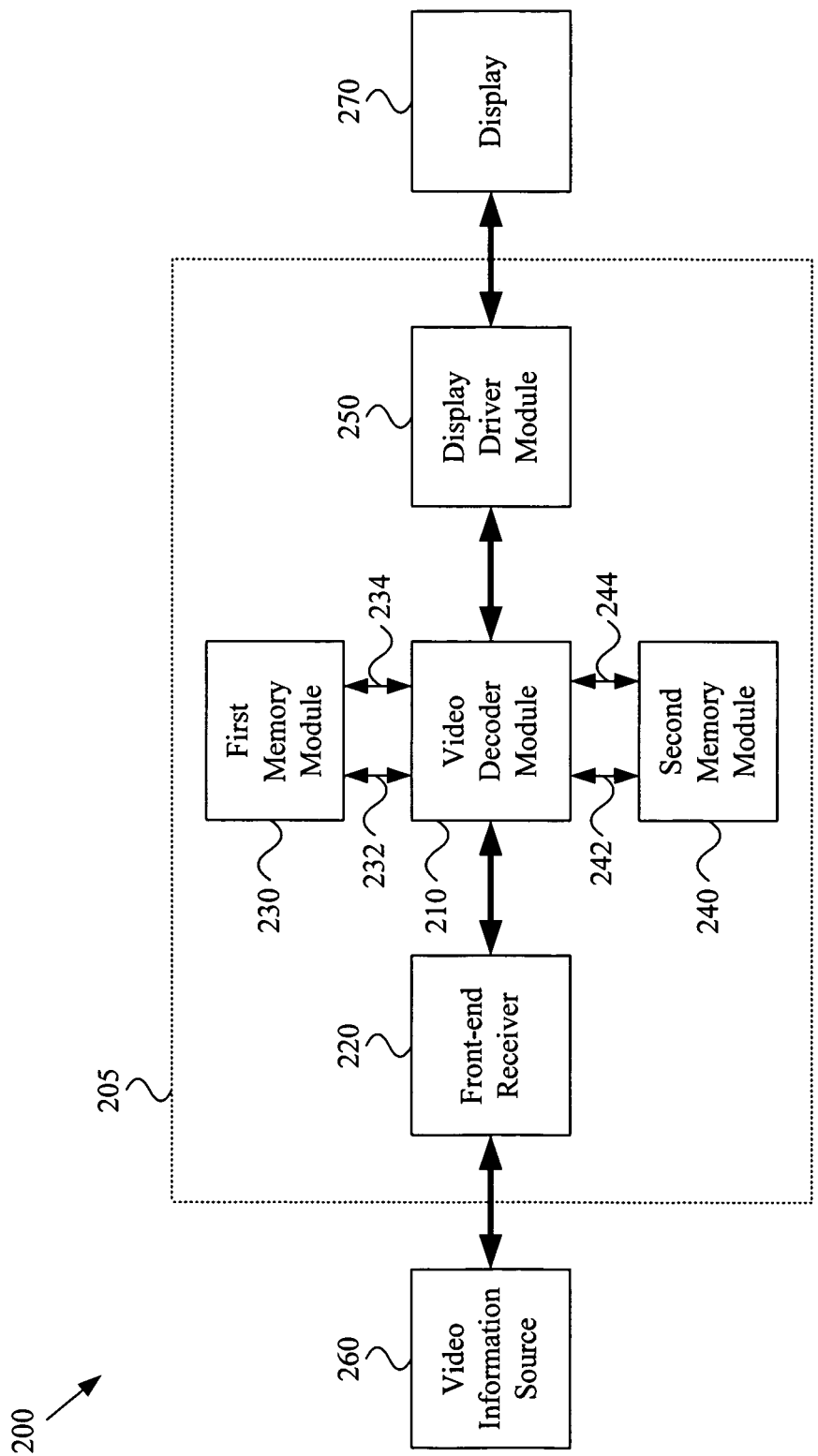
FIG. 2 is a block diagram of an exemplary video processing system, in accordance with various aspects of the present invention.

FIG. 2 is a block diagram of an exemplary video processing system 200, in accordance with various aspects of the present invention. The exemplary video processing system 200 may, for example and without limitation, share various characteristics with the exemplary video processing system 100 illustrated in FIG. 1 and discussed previously.

The exemplary video processing system 200 may comprise a video information source 260, which provides one or more signals comprising encoded video information. The exemplary video processing system 200 may also comprise a video processing subsystem 205, communicatively coupled to the video information source 260, which receives the one or more signals comprising encoded video information, processes the encoded video information, and outputs one or more signals comprising decoded video information. The exemplary video processing system 200 may also comprise a display device 270, communicatively coupled to the video processing subsystem 205, which receives the one or more signals comprising decoded video information and generates a visible representation of the decoded video information.

The video information source 260 may, for example and without limitation, share various characteristics with the video information source 120 of the exemplary video processing system 100 illustrated in FIG. 1 and discussed previously. For example and without limitation, the video information source 260 may comprise characteristics of a communication network transmitter. Such a communication network transmitter may, for example, transmit encoded video information over various communication networks (e.g., a cable or satellite television communication network, computer network, telecommunication network, etc.).

The video processing subsystem 205 may comprise characteristics of any of a variety of video processing systems. For example and without limitation, the video processing subsystem 205 may comprise characteristics of a satellite or cable set top box. Also for example, the video processing subsystem 205 may comprise characteristics of a computer (e.g., desktop computer, laptop computer, notebook computer, pocket computer, etc.). Further for example, the video processing subsystem 205 may comprise characteristics of a portable phone (e.g., a cellular telephone) or personal email device. Still further for example, the video processing subsystem 205 may comprise characteristics of a video display device with integrated video processing hardware. Also for example, the video processing subsystem 205 may comprise characteristics of a portable motion picture camera, portable movie player, or automotive video player. Accordingly, the scope of various aspects of the present invention should not be limited by characteristics of any particular video processing system.

The video processing subsystem 205 may comprise a front-end receiver 220, which is communicatively coupled to the video information source 260. The front-end receiver 220 may, for example, receive one or more signals communicating encoded video information and output one or more data streams corresponding to the encoded video information.

The front-end receiver 220 may comprise characteristics of any of a variety of communication receivers. The front-end receiver 220 may, for example, be adapted to receive video information communicated over any of a variety of media (e.g., wired, wireless RF, tethered optical, non-tethered optical, etc.) and use any of a large variety of communication protocols (e.g., standard or proprietary communication protocols). For example and without limitation, the front-end receiver 220 may comprise characteristics of a satellite communication receiver, a cable television receiver, an optical signal receiver, a computer modem, a wireless telephone receiver, a wireless router receiver, etc. Accordingly, the scope of various aspects of the present invention should not be limited by characteristics of any particular type of receiver.

The video processing subsystem 205 may also comprise a video decoder module 210 that is communicatively coupled to the front-end receiver 220. The video decoder module 210 may, for example, generally receive encoded video information (e.g., from the front-end receiver 220) and output decoded video information. The video decoder module 210 may, for example and without limitation, share various characteristics with the video decoder module 110 of the exemplary video processing system 100 illustrated in FIG. 1 and discussed previously.

The video processing subsystem 205 may additionally comprise a first memory module 230 that is communicatively coupled to the video decoder module 210 with a first address bus 232 and a first data bus 234. The first memory module 230 may, for example and without limitation, share various characteristics with the first memory module 130 of the exemplary video processing system 100 illustrated in FIG. 1 and discussed previously. Additionally, for example and without limitation, the first address bus 232 and the first data bus 234 may share various characteristics with the first communication bus 131 of the exemplary video processing system 100 illustrated in FIG. 1 and discussed previously. In general, the first address bus 232 and first data bus 234 may comprise characteristics of any of a large variety of communication bus architectures.

The video processing subsystem 205 may additionally comprise a second memory module 240 that is communicatively coupled to the video decoder module 210 with a second address bus 242 and a second data bus 244. The second memory module 240 may, for example and without limitation, share various characteristics with the second memory module 140 of the exemplary video processing system 100 illustrated in FIG. 1 and discussed previously. Additionally, for example and without limitation, the second address bus 242 and the second data bus 244 may share various characteristics with the second communication bus 141 of the exemplary video processing system 100 illustrated in FIG. 1 and discussed previously. In general, the first address bus 242 and first data bus 244 may comprise characteristics of any of a large variety of communication bus architectures.

The second address bus 242 and second data bus 244 may, for example and without limitation, share various characteristics with the first address bus 232 and the first data bus 234 discussed previously. In a first non-limiting exemplary scenario, the second address bus 242 may share at least a portion of address lines with the first address bus 232, and the second data bus 244 may share at least a portion of data lines with the first data bus 234. In a second non-limiting exemplary scenario, the second address bus 242 may share at least a portion of address lines with the first address bus 232, while the second data bus 244 is independent of the first data bus 234. In a third non-limiting exemplary scenario, the second data bus 244 may share at least a portion of data lines with the first data bus 234, while the second address bus 242 is independent of the first address bus 232.

The second address and data buses 242, 244 may both, for example, be independent of the first address and data buses 232, 234. That is, the video decoder module 210 may communicate with the first memory module 230 and the second memory module 240 independently, and for example, concurrently. In a first non-limiting exemplary scenario, the second address and data buses 242, 244 may exclusively couple the second memory module 240 to the video decoder module 210. That is, the video decoder module 210 may be the only module capable of communicating information with (e.g., reading information from or writing information to) the second memory module 240. For example, the video decoder module 210 and the second memory module 240 may comprise respective dedicated interfaces to perform such exclusive communication. Such respective interfaces may, for example and without limitation, be customized to efficiently communicate one or more particular types of information (e.g., motion compensation information/reference video information).

In general, the second address and data buses 242, 244 may communicatively couple the second memory module 240 and the video decoder module 210. The second address and data buses 242, 244 may comprise characteristics of any of a large variety of address and data bus architectures. Accordingly, the scope of various aspects of the present invention should not be limited by characteristics of any particular type of address or data bus architecture.

The video processing subsystem 205 may further comprise a display driver module 250, which is communicatively coupled to the video decoder module 210. The display driver module 250 may, for example, generally receive decoded video information from the video decoder module 210 and output one or more display driver signals that will cause a display to output a visible representation of the decoded video information. The display driver module 250 may, for example and without limitation, share various characteristics with the communication module 150 of the exemplary video processing system 100 illustrated in FIG. 1 and discussed previously. The exemplary display driver module 250 may, for example, generate and output composite and/or component video signals.

The display device 270 of the video processing system 200 may be communicatively coupled to the display driver module 250 of the video processing subsystem 205. The display device 270 may, for example, receive one or more display driver signals from the display driver module 250, where the display driver signal(s) is representative of decoded video information, and output a visible representation of the decoded video information. The display device 270 may comprise characteristics of any of a variety of video display devices (e.g., television or computer monitors, handheld displays, cathode ray tubes, plasma displays, LCD displays, etc.). The display device 270 may, for example, be integrated with the video processing subsystem 205 or may be an independent device. The scope of various aspects of the present invention should not be limited by characteristics of any particular type of display device.

As with the exemplary video processing system 100 illustrated in FIG. 1 and discussed previously, the scope of various aspects of the present invention should not be limited to characteristics of the previously discussed two memory module scenario. Also, the scope of various aspects of the present invention should not be limited by characteristics of any particular module implementations or by arbitrary notions of module boundaries.

The various modules discussed previously may be implemented utilizing hardware, software and/or a combination thereof. Additionally, various modules may share various hardware and/or software components. For example and without limitation, a first module and a second module may share various hardware components or software sub-routines. Accordingly, the scope of various aspects of the present invention should not be limited by characteristics of any particular module implementations or by arbitrary notions of module boundaries.

The exemplary video processing system 200 was presented above to provide specific illustrations of various broader aspects of the present invention. Accordingly, the scope of various aspects of the present invention should not be limited by characteristics of the exemplary video processing system 200.

Figure 3:
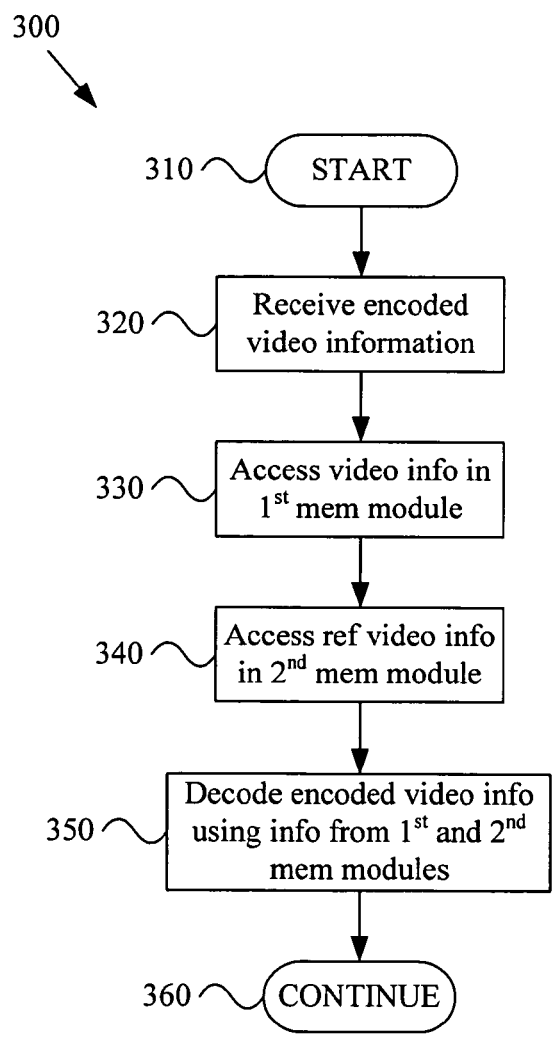
FIG. 3 is a flow diagram illustrating an exemplary method for processing video information, in accordance with various aspects of the present invention.

FIG. 3 is a flow diagram illustrating an exemplary method 300 for processing video information, in accordance with various aspects of the present invention. The exemplary method may, for example and without limitation, share various functional characteristics with the exemplary systems 100, 200 illustrated in FIGS. 1-2 and discussed previously.

The exemplary method 300 may begin at step 310. The exemplary method 300 may begin execution for any of a large variety of reasons. For example and without limitation, the method 300 may begin execution upon powering up or resetting a video processing system implementing the method 300. Also for example, the exemplary method 300 may begin execution in response to a command received from another system component or from a user. Further for example, the exemplary method 300 may begin execution in response to a detected system condition. Accordingly, the scope of various aspects of the present invention should not be limited by characteristics of any particular initiating cause or condition.

The exemplary method 300 may, at step 320, comprise receiving encoded video information for a current video block of a current video frame. Step 320 may, for example and without limitation, share various information-receiving characteristics with the video decoder modules 110, 210 and the front-end receiver 220 of the exemplary video processing systems 100, 200 illustrated in FIGS. 1-2 and discussed previously. For example, step 320 may comprise receiving encoded video information in any of a variety of manners.

Step 320 may, for example, comprise receiving an encoded video signal from a video information source. Such a video information source may, for example and without limitation, share various characteristics with the video information sources 120, 260 illustrated in FIGS. 1-2 and discussed previously. For example, such a video information source may comprise characteristics of a communication network transmitter (e.g., a cable TV transmitter, satellite TV transmitter, computer network server, telecommunication transmitter, cellular telephone base or mobile transmitter, etc.). Step 320 may, for example, comprise receiving an encoded video signal over any of a variety of communication media and using any of a variety of communication protocols.

Step 220 may also, for example and without limitation, share various functional characteristics with the front-end receiver 220 and the video decoder module 210 of the exemplary video processing system 200 illustrated in FIG. 2 and discussed previously. For example, step 320 may comprise receiving an encoded video signal from a receiver of encoded video information that is communicated through a communication network (e.g., a cable television receiver, satellite television receiver, computer modem, wireless telephone receiver, etc.). Step 320 may additionally, for example, comprise receiving an encoded video signal from a device capable of reading information from an information (or data) storage medium (e.g., a DVD drive, CD drive, hard drive mini-hard drive, zip drive, solid-state memory module drive, etc.).

In general, exemplary step 320 may comprise receiving encoded video information for a current video block of a current video frame. Accordingly, the scope of various aspects of the present invention should not be limited by characteristics of any particular manner of receiving video information.

As discussed previously with regard to the exemplary video processing system 100 illustrated in FIG. 1, the received encoded video information may be encoded in a manner commensurate with any of a large variety of known, or yet to be developed, video encoding techniques. For example and without limitation, the received encoded video information may be encoded (or compressed) in accordance with a block encoding technique (e.g., MPEG-2; MPEG-4; or MPEG-4, part 10), as discussed previously. The scope of various aspects of the present invention should not be limited by characteristics of any particular video information encoding technique.

The exemplary method 300 may, at step 330, comprise accessing video processing information in a first memory module. Step 330 may, for example and without limitation, share various functional characteristics with the video decoder modules 110, 210 and first memory modules 130, 230 of the exemplary video processing systems 100, 200 illustrated in FIGS. 1-2 and discussed previously.

Step 330 may comprise accessing video processing information in a first memory module in any of a variety of manners. For example, step 330 may comprise accessing video processing information in the first memory module using a first communication bus. Such a first communication bus may, for example and without limitation, share various characteristics with the first communication bus 131, first address bus 232 and first data bus 234 of the exemplary video processing systems 100, 200 illustrated in FIGS. 1-2 and discussed previously. Such a first communication bus may, for example, comprise a first address bus and a first data bus. Such a first communication bus may generally comprise characteristics of any of a large variety of communication bus architectures.

The first memory module may, for example and without limitation, share various characteristics with the first memory modules 130, 230 of the exemplary video processing systems 100, 200 illustrated in FIGS. 1-2 and discussed previously. The first memory module may comprise characteristics of any of a variety of memory modules or memory types (e.g., RAM, DRAM, DDR DRAM, DDR-II DRAM, etc.). The first memory module may, for example, be generally characterized by n-bit wide access. The first memory module may also, for example, be integrated with a module or system implementing the exemplary method 300 or may be separate. Accordingly, the scope of various aspects of the present invention should not be limited by characteristics of any particular memory module, type of memory, data access width, or degree of integration.

The video processing information may, for example and without limitation, share various characteristics with the video processing information discussed previously with regard to FIGS. 1-2. The video processing information accessed from the first memory module may, for example, comprise any of a variety of video processing information characteristics.

For example and without limitation, the video processing information may comprise characteristics of information generally utilized to decode the encoded video information received at step 320. Also for example, the video processing information may comprise raw encoded video stream information (e.g., as may have been received at step 320). Further for example, the video processing information may comprise video information (or data) that is in the process of being decoded or reconstructed into pixel information. Additionally for example, the video processing information may comprise video information that has been converted into display or television driving information. The first memory module may also, for example, store CPU instructions, CPU data, general data cache information, etc. The scope of various aspects of the present invention should not be limited by characteristics of particular information that may be stored in, accessed in, or retrieved from the first memory module.

The exemplary method 300 may, at step 340, comprise accessing reference video information from a previous video frame in a second memory module. Step 340 may, for example and without limitation, share various functional characteristics with the video decoder modules 110, 210 and second memory modules 140, 240 of the exemplary video processing systems 100, 200 illustrated in FIGS. 1-2 and discussed previously.

Step 340 may comprise accessing reference video information in a second memory module in any of a variety of manners. For example, step 340 may comprise accessing reference video information in the second memory module using a second communication bus. Such a second communication bus may, for example and without limitation, share various characteristics with the second communication bus 141, second address bus 242 and second data bus 244 of the exemplary video processing systems 100, 200 illustrated in FIGS. 1-2 and discussed previously. Such a second communication bus may, for example, comprise a second address bus and a second data bus. Such a second communication bus may generally comprise characteristics of any of a large variety of communication bus architectures.

The second communication bus may, for example and without limitation, share various characteristics with the first communication bus discussed previously with regard to step 330. For example, the second communication bus may share various components with the first communication bus. In a first non-limiting exemplary scenario, the second communication bus may share at least a portion of address and data lines with the first communication bus. In a second non-limiting exemplary scenario, the second communication bus may share at least a portion of address lines with the first communication bus but not share any data lines. In a third non-limiting exemplary scenario, the second communication bus may share at least a portion of data lines with the first communication bus but not share any address lines.

The second communication bus and the first communication bus may also, for example, be independent. That is, exemplary step 330 may comprise communicating with the first memory module with the first communication bus, and exemplary step 340 may comprise communicating with the second memory module with the second communication bus independently, and for example, concurrently. In a first non-limiting exemplary scenario, the second communication bus may exclusively couple the second memory module to a module or system implementing the exemplary method 300 (e.g., a video decoder module or system comprising a video decoder module). That is, the module or system implementing the exemplary method 300 may be the only module or system capable of communicating information with (e.g., reading information from or writing information to) the second memory module. Such an exclusive communication link may, for example, comprise dedicated interfaces to perform such exclusive communication. Such dedicated interfaces may, for example, be customized to efficiently communicate one or more particular types of information (e.g., motion compensation information, including reference video information).

In general, the second communication bus may communicatively couple the second memory module and a module or system implementing the exemplary method 300. The second communication bus may comprise characteristics of any of a large variety of communication bus architectures. Accordingly, the scope of various aspects of the present invention should not be limited by characteristics of any particular type of communication bus architecture.

The second memory module may comprise characteristics of any of a large variety of memory modules or memory types (e.g., RAM, DRAM, DDR DRAM, DDR-II DRAM, etc.). The second memory module may, for example, be generally characterized by m-bit wide access. In a non-limiting exemplary scenario, the second memory module may be characterized by an m-bit wide access, and the first memory module (discussed previously) may be characterized by an n-bit wide access, where m is less than n. In such an exemplary scenario, the second memory module may be utilized for storing various types of information that are relatively more efficiently accessed with narrower memory accesses, and the first memory module may be utilized for storing various types of information that are relatively more efficiently accessed with wider memory accesses. The second memory module may also, for example, be integrated with a module implementing the exemplary method 300 or may be separate. Accordingly, the scope of various aspects of the present invention should not be limited by characteristics of a particular memory module, type of memory, data access width, or degree of integration.

As mentioned previous, step 340 may comprise accessing reference video information (or other motion compensation information) in the second memory module. The second memory module may, for example, store motion compensation information (e.g., reference video information) that may be utilized by a module or system implementing the exemplary method 300 (e.g., a video decoder module or video processing system) to decode encoded video information received from a video information source. Such reference video information may, for example and without limitation, comprise video information corresponding to a previous video frame (e.g., information from a previous video frame that was utilized to encode the current encoded video information).

In various exemplary scenarios, the second memory module may store information in addition to motion compensation information. As explained in a previous example, the second memory module may be exclusively linked to the module or system implementing the exemplary method 300. In such an exemplary configuration, such a module or system may utilize the second memory module to store any of a variety of private information (i.e., information utilized only by such module or system).

The exemplary method 300 may, at step 350, comprise utilizing the video processing information from the first memory module and the reference video information from the second memory module to decode the received encoded video information (e.g., as received at step 320). Step 350 may, for example and without limitation, share various functional characteristics with the video decoder modules 110, 210 of the exemplary video processing systems 100, 200 illustrated in FIGS. 1-2 and discussed previously.

Step 350 may comprise utilizing the video processing information (e.g., as accessed at step 330) and the reference video information (e.g., as accessed at step 340) to decode the received encoded video information (e.g., as received at step 320) in any of a variety of manners. As mentioned previously, such encoded video information may have been encoded with any of a variety of video encoding techniques (e.g., a video block encoding technique). Step 350 may generally comprise decoding the received encoded video information in a manner corresponding to the particular encoding technique utilized to encode the received video information. Accordingly, the scope of various aspects of the present invention should not be limited by characteristics of any particular type of video encoding or decoding technique (e.g., including any particular block encoding technique).

In a non-limiting exemplary scenario, the second memory module may generally store reference video information (e.g., decoded video information generally related to a previous video frame), and the first memory module may generally store non-reference video information (e.g., information generally related to the current video frame). Step 340 may then, for example, comprise accessing reference video information stored in the second memory module, step 330 may comprise accessing non-reference video information stored in the first memory module, and step 350 may comprise utilizing such accessed information to decode encoded video information received from a video information source at step 320.

In another non-limiting exemplary scenario, the second memory module may generally store decoded reference video information (e.g., from a previous decoded video frame and also from previously decoded blocks of the current video frame), and the first memory module may generally store video information that is encoded or partially decoded. Step 340 may, for example, comprise accessing the decoded reference video information stored in the second memory module, step 330 may comprise accessing encoded or partially decoded video information stored in the first memory module, and step 350 may comprise utilizing such accessed information to decode encoded video information received from a video information source at step 320.

The exemplary method 300 may, at step 360, comprise performing continued processing. For example and without limitation, step 360 may share various functional characteristics with the exemplary video processing systems 100, 200 illustrated in FIGS. 1-2 and discussed previously. Step 360 may comprise performing any of a large variety of continued processing activities.

For example, after step 350 decodes the received encoded video information, step 360 may comprise storing at least a portion of the newly decoded video information in the second memory module (e.g., as reference video information for future received encoded video information). In a first non-limiting exemplary scenario, after step 350 completes decoding a current video frame, step 360 may comprise storing information of the decoded current video frame in the second memory module to utilize as reference video information for decoding the next encoded video frame (e.g., to be received at step 320).

In a second non-limiting exemplary scenario, after step 350 completes decoding a current video block of a video frame, step 360 may comprise storing information of the decoded current video block in the second memory module. Note that the second memory module may store information of more than one reference video frame. In a third non-limiting exemplary scenario, after step 350 completes decoding a video block of a video frame and after determining that a corresponding block (or region) in a previous reference video frame will no longer be utilized, step 360 may comprise storing information of the decoded video block in the second memory module. In general, step 360 may comprise updating or maintaining the second memory module in any of a variety of manners. Accordingly, the scope of various aspects of the present invention should not be limited by any particular manner of maintaining information in a memory module.

Exemplary step 360 may, for example and without limitation, share various functional characteristics with the communication module 150 and the display driver module 250 of the exemplary video processing systems 100, 200 illustrated in FIGS. 1-2 and discussed previously. For example, step 360 may comprise communicating various information related to the decoded video information to any of a variety of video devices (e.g., utilizing any of a variety of communication media and/or protocols). Additionally for example, step 360 may comprise communicating decoded video information to one or more display devices or televisions (e.g., in display driver signals or television signals). Accordingly, the scope of various aspects of the present invention should not be limited by characteristics of any particular manner of communicating decoded video information.

In a non-limiting exemplary scenario, the step 360 may comprise communicating decoded video data (e.g., as decoded at step 350) to a video receiver. In another non-limiting exemplary scenario, step 360 may comprise communicating decoded video information to a video display device. In yet another non-limiting exemplary scenario, step 360 may comprise communicating decoded video information to a television (e.g., standard definition or high definition television). For example, step 360 may comprise outputting component and/or composite video signals. Step 360 may, for example, comprise communicating the decoded video information to a local video receiver or a distant video receiver.

In a non-limiting exemplary scenario, the exemplary method 300 may be implemented by one or more components of a video display device or television. Step 360 may, for example, comprise communicating the decoded video information to local circuitry that generates visible video information. In another non-limiting exemplary scenario, the exemplary method 300 may be implemented in a cable or satellite receiver box or a computer chassis, which is communicatively coupled to a display device or television. Step 360 may then, for example, comprise communicating the decoded video information (i.e., one or more signals representative thereof) to the communicatively coupled display device. Also for example step 360 may comprise converting decoded video information into at least one display driver signal and communicating the at least one display driver signal to a display device. Further for example, step 360 may comprise converting decoded video information into at least one television input signal and communicating the at least one television input signal to a television.

In yet another non-limiting exemplary scenario, the exemplary method 300 may be implemented in a video server of an office, building or campus, which is communicatively coupled by a data communication network to various devices with video display capability. Step 360 may then, for example, comprise communicating decoded video data to the various devices over the data communication network in a manner commensurate with video data communication over the data communication network.

In general, step 360 may comprise performing continued processing. Accordingly, the scope of various aspects of the present invention should not be limited by characteristics of any particular type of continued processing.

The exemplary method 300 was presented to provide specific illustrations of various generally broader aspects of the present invention. Accordingly, the scope of various aspects of the present invention should not be limited by characteristics of the exemplary method 300.

The exemplary method 300 illustrated in FIG. 3 and discussed previously, and the exemplary systems 100, 200 illustrated in FIGS. 1-2 and discussed previously may, for example, be implemented utilizing a wide range of hardware, software, or a combination thereof. For example, various aspects of the exemplary method 300 and systems 100, 200 may be implemented by a general-purpose processor or an application-specific processor executing software and/or firmware instructions. Also, for example, various aspects may be implemented by discrete hardware. Additionally, for example, various aspects may be implemented by a single integrated circuit or a set of integrated circuits. Further, for example, various aspects may be implemented by a single physical system or a distributed network of physical systems. Accordingly, the scope of various aspects of the present invention should not be limited by a particular system configuration or implementation of any of the exemplary methods or systems previously discussed.

In summary, various aspects of the present invention provide a system and method for processing video information. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A video processing system comprising:
a decoder module that decodes block encoded video information;
a first external memory module, communicatively coupled to the decoder module, configured to store non-reference video information, the first external memory module configured to store video processing information utilized by the decoder module for decoding a current video block from a current video frame; and
a second external memory module, communicatively coupled to the decoder module, configured to store reference video information relating to previously decoded data, the second external memory module configured to store a previously decoded reference video frame utilized by the decoder module for decoding the current video block, wherein the decoder module is configured to access the first external memory module and the second external memory module concurrently, and wherein the decoder module has exclusive access to the second memory module, wherein the first external memory module is characterized by n-bit access, and the second external memory module is characterized by m-bit access, where m is less than n.

2. The system of claim 1, wherein the first external memory module is communicatively coupled to the decoder module with a first data bus, and the second external memory module is communicatively coupled to the decoder module with a second data bus that is independent of the first data bus.

3. The system of claim 1, wherein the first external memory module is communicatively coupled to the decoder module with a first address bus, and the second external memory module is communicatively coupled to the decoder module with a second address bus that is independent of the first address bus.

4. The system of claim 1, wherein the decoder module has exclusive access to the second external memory module.

5. The system of claim 1, wherein the second external memory module is communicatively coupled to the decoder module with a communication interface customized to efficiently communicate motion compensation information.

6. The system of claim 1, wherein the first external memory module and second external memory module reside on a first integrated circuit, and the decoder module resides on a second integrated circuit.

7. The system of claim 1, further comprising a communication module, communicatively coupled to the decoder module, that communicates decoded video information to a video receiver.

8. The system of claim 1, further comprising a television driver module, communicatively coupled to the decoder module, that communicates television driver signals to a television.

9. The system of claim 1, further comprising a display driver module, communicatively coupled to the decoder module, that communicates display driver signals to a display.

10. The system of claim 9, further comprising a display that receives display driver signals from the display driver module and presents corresponding video information in visible form.

11. The system of claim 1, further comprising a receiver module that is communicatively coupled to the decoder module and a video information source, wherein the receiver module receives a signal comprising encoded video information from the video information source and communicates the encoded video information to the decoder module.

12. The system of claim 11, wherein the video information source comprises a communication network transmitter.

13. The system of claim 11, wherein the video information source comprises a device that retrieves the encoded video information from a data storage medium.

14. The system of claim 1, wherein after decoding the current video frame, the decoder module updates reference video information stored in the second external memory module in accordance with the decoded current video frame.

15. The system of claim 1, wherein all reference video frames are substantially stored in the second external memory module.

16. A method for processing video information, the method comprising:
receiving encoded video information for a current video block of a current video frame;
accessing, by a decoder module, non-reference video information stored in a first external memory module;
accessing, by the decoder module, reference video information from a previously decoded reference video frame stored in a second external memory module; and
utilizing, by the decoder module, video processing information from the first external memory module and the reference video information from the second external memory module to decode the received encoded video information,
wherein the decoder module accesses the first external memory module and the second external memory module concurrently,
wherein the first external memory module is characterized by n-bit access, and the second external memory module is characterized by m-bit access, where m is less than n, and
wherein the decoder module has exclusive access to the second external memory module.

17. The method of claim 16, wherein accessing video processing information in the first external memory module comprises accessing the video processing information in the first external memory module through a first data bus, and accessing reference video information in the second external memory module comprises accessing the reference video information in the second external memory module through a second data bus that is independent of the first data bus.

18. The method of claim 16, wherein accessing video processing information in the first external memory module comprises accessing the video processing information in the first external memory module utilizing a first address bus, and accessing reference video information in the second external memory module comprises accessing the reference video information in the second external memory module utilizing a second address bus that is independent of the first address bus.

19. The method of claim 16, wherein reference video information from a previous video frame is exclusively accessed from the second external memory module.

20. The method of claim 16, wherein accessing reference video information from the previously decoded reference video frame stored in the second external memory module comprises accessing the reference video information through a communication interface customized to efficiently communicate reference video information.

21. The method of claim 16, further comprising communicating decoded video information to a video receiver.

22. The method of claim 16, further comprising:
converting decoded video information into at least one television driver signal; and
communicating the at least one television driver signal to a television.

23. The method of claim 16, further comprising:
converting decoded video information into at least one display driver signal; and
communicating the at least one display driver signal to a display.

24. The method of claim 16, wherein receiving encoded video information for the current video block of the current video frame comprises receiving the encoded video information over a video information communication network.

25. The method of claim 16, wherein receiving encoded video information for the current video block of the current video frame comprises reading the encoded video information from a data storage medium.

26. The method of claim 16, further comprising updating information stored in the second external memory module in accordance with the decoded received video information.

27. The method of claim 16, wherein all reference video information is substantially stored in the second external memory module.

28. A video processing system comprising:
- a decoder module that decodes block encoded video information;
- a first external memory module, communicatively coupled to the decoder module, configured to store non-reference video information, the first external memory module configured to store video processing information utilized by the decoder module for decoding a current video block from a current video frame; and
- a second external memory module, communicatively coupled to the decoder module, configured to store reference video information relating to previously decoded data, the second external memory module configured to store a previously decoded reference video frame utilized by the decoder module for decoding the current video block, wherein the decoder module is configured to access the first external memory module and the second external memory module concurrently, and wherein the decoder module has exclusive access to the second external memory module,
- wherein the first external memory module and second external memory module reside on a first integrated circuit, and the decoder module resides on a second integrated circuit.

* * * * *